No. 746,688. Patented December 15, 1903.

UNITED STATES PATENT OFFICE.

DANIEL HENRI DUPONT-FRANKLIN, OF NEW YORK, N. Y.

SUBSTANCE RESEMBLING INDIA-RUBBER.

SPECIFICATION forming part of Letters Patent No. 746,688, dated December 15, 1903.

Application filed May 13, 1903. Serial No. 156,982. (No specimens.)

*To all whom it may concern:*

Be it known that I, DANIEL HENRI DUPONT-FRANKLIN, a citizen of the French Republic, residing in the city, county, and State of New York, have invented a certain new and useful Substance Resembling India-Rubber, of which the following is a full, clear, and exact specification.

My invention comprises a substance resembling india-rubber.

In a copending application filed May 13, 1903, Serial No. 156,983, I have described and claimed the method of producing said substance and in my present application lay claim to said substance itself.

The substance herein referred to consists of a mixture of a hydrocarbon and an acid, said mixture being supplied with a proper amount of oxygen.

Various hydrocarbons and acids may be employed in producing the substance aforementioned; but as a specific example I refer to a substance which is composed of one hundred parts of coal-tar, twenty-five parts of boracic acid and a suitable quantity of oxygen.

Having now described my invention, what I claim as new, and desire to secure by Letters Patent, is—

1. As a new article of manufacture, a substance resembling india-rubber comprising a hydrocarbon, boracic acid and oxygen, substantially as described.

2. As a new article of manufacture a substance resembling india-rubber consisting of one hundred parts of coal-tar, twenty-five parts of boracic acid and a suitable quantity of oxygen, substantially as described.

In witness whereof I have hereunto set my hand, in presence of two witnesses, at New York, this 12th day of May, 1903.

DANIEL HENRI DUPONT-FRANKLIN.

In presence of—
 ALFRED L. WEISSENTHANNY,
 OTTO MUNK.